United States Patent
Lubawy

(10) Patent No.: US 8,614,565 B2
(45) Date of Patent: Dec. 24, 2013

(54) SYSTEMS AND METHODS FOR ABSORBING WASTE ELECTRICITY FROM REGENERATIVE BRAKING IN HYBRIDIZED VEHICLES

(75) Inventor: Andrea L. Lubawy, San Pedro, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 346 days.

(21) Appl. No.: 13/175,654

(22) Filed: Jul. 1, 2011

(65) Prior Publication Data

US 2011/0260660 A1    Oct. 27, 2011

Related U.S. Application Data

(62) Division of application No. 12/242,776, filed on Sep. 30, 2008, now Pat. No. 8,035,349.

(51) Int. Cl.
*H02J 7/00* (2006.01)
*H02J 7/04* (2006.01)
*H02J 7/16* (2006.01)

(52) U.S. Cl.
USPC .......................................... 320/150; 320/134

(58) Field of Classification Search
USPC ......................................................... 320/150
See application file for complete search history.

(56) References Cited

U.S. PATENT DOCUMENTS

| | | | |
|---|---|---|---|
| 4,148,192 A | 4/1979 | Cummings | |
| 4,305,254 A | 12/1981 | Kawakatsu et al. | |
| 5,659,240 A | 8/1997 | King | |
| 6,605,773 B2 | 8/2003 | Kok et al. | |
| 7,061,208 B2 | 6/2006 | Nishihata et al. | |
| 7,246,496 B2 | 7/2007 | Goenka et al. | |
| 7,253,353 B2 | 8/2007 | Stabler | |
| 7,426,910 B2 * | 9/2008 | Elwart | 123/46 E |
| 7,859,220 B2 * | 12/2010 | Bushong et al. | 320/107 |
| 2005/0247446 A1 * | 11/2005 | Gawthrop | 165/202 |
| 2006/0028182 A1 | 2/2006 | Yang et al. | |
| 2006/0043926 A1 * | 3/2006 | Nakasho et al. | 320/107 |
| 2008/0012535 A1 * | 1/2008 | Takatsuji et al. | 320/150 |
| 2009/0026987 A1 | 1/2009 | Takahashi | |
| 2009/0064696 A1 * | 3/2009 | Perkins | 62/244 |
| 2010/0065380 A1 * | 3/2010 | Chen et al. | 187/290 |

FOREIGN PATENT DOCUMENTS

JP          9130917         5/1997

* cited by examiner

*Primary Examiner* — Arun Williams
(74) *Attorney, Agent, or Firm* — Snell & Wilmer LLP

(57) ABSTRACT

The invention relates to a system for absorbing electric energy from regenerative braking. The system includes a battery, a thermoelectric module in thermally-conductive contact with the battery, a generator for generating an electric current from regenerative braking, the generator connected to the battery via a first switch and connected to the thermoelectric module via a second switch, and a sensor for measuring a temperature and a charge state of the battery. The system also comprises a controller for activating and deactivating the first switch and the second switch when certain conditions have been met.

20 Claims, 2 Drawing Sheets

SYSTEMS AND METHODS FOR ABSORBING WASTE ELECTRICITY FROM REGENERATIVE BRAKING IN HYBRIDIZED VEHICLES

CROSS REFERENCE TO RELATED APPLICATION

This application is a divisional application of U.S. patent application Ser. No. 12/242,776, entitled "SYSTEMS AND METHODS FOR ABSORBING WASTE ELECTRICITY FROM REGENERATIVE BRAKING IN HYBRIDIZED VEHICLES," filed on Sep. 30, 2008, now U.S. Pat. No. 8,035,349, the entire disclosure of which is hereby incorporated by reference herein.

BACKGROUND

1. Field

The invention relates to systems and methods for absorbing electric energy or waste electricity from regenerative braking in hybridized vehicles. More particularly, the invention relates to systems and methods for using thermoelectric devices to absorb electric energy or waste electricity from regenerative braking in hybridized vehicles.

2. Background

The term "hybrid vehicle" is commonly referred to as a vehicle that utilizes more than one power source for propulsion. For example, a hybrid vehicle can be a vehicle that uses an internal combustion engine as a primary power source and an electric motor as a secondary power source. The electric motor can operate independently of or in conjunction with the internal combustion engine to drive the wheels of the vehicle. The electric motor enhances the fuel efficiency of the internal combustion engine.

The electric motor can be powered by a number of batteries that need to be recharged on a regular basis. The batteries can be used to drive the electric motor and other components of the vehicle. The batteries are generally high-voltage (200-400 volts) batteries. A generator may be used to charge the batteries.

Upon deceleration or downhill driving of a hybrid vehicle, the generator creates energy by regenerative braking and transfers the energy to the batteries for charging. Regenerative braking has the effect of slowing the vehicle down when traveling on a flat surface and reducing acceleration of the vehicle when traveling downhill. The batteries are continuously charged by regenerative braking.

Continuously charging the batteries by regenerative braking has several drawbacks. First, the batteries can reach or exceed a predetermined maximum state-of-charge. Second, the batteries can reach or exceed a predetermined maximum temperature. In both cases, the batteries cannot accept any additional charge or risk being damaged from overcharging or overheating. Therefore, the amount of electric energy that can be absorbed by the batteries from regenerative braking may be limited due to the afore-mentioned drawbacks. If the batteries cannot absorb the energy from regenerative braking, the generator may be disengaged and the slowing or retarding force to the vehicle is reduced or eliminated.

Therefore, a need exists in the art for providing systems and methods to absorb electric energy or waste electricity from regenerative braking in hybridized vehicles.

SUMMARY

In one embodiment, the invention is a system for absorbing electric energy from regenerative braking. The system comprises a battery, a thermoelectric module in thermally-conductive contact with the battery, a generator for generating an electric current from regenerative braking, the generator connected to the battery via a first switch and connected to the thermoelectric module via a second switch, and one or more sensors for measuring a temperature and a charge state or state-of-charge of the battery. The system also comprises a controller for deactivating the first switch and activating the second switch when the charge state is equal to or greater than a maximum charge state of the battery, wherein the electric current is transferred to the thermoelectric module and has a polarity that causes the thermoelectric module to alternately cool and heat the battery in order to absorb the excess energy and change battery temperature if needed. The alternating may be performed every 5 seconds, for example.

The system also comprises a controller for (1) deactivating the first switch and activating the second switch when the battery temperature is equal to or greater than a maximum temperature of the battery, wherein the electric current is transferred to the thermoelectric module and has a polarity that causes the thermoelectric module to cool the battery, (2) deactivating the first switch and activating the second switch when the battery temperature is below a minimum battery temperature, wherein the electric current is transferred to the thermoelectric module and has a polarity that causes the thermoelectric module to heat the battery, and (3) deactivating the first switch and activating the second switch when the charge state is equal to or greater than a maximum charge state of the battery, wherein the electric current is transferred to the thermoelectric module and has a polarity that causes the thermoelectric module to alternately heat and cool the battery to absorb the excess electric current without changing the charge or net state of the battery.

In another embodiment, the invention is a method of absorbing electricity from regenerative braking. The method includes measuring an actual temperature of a battery using a first sensor, measuring a charge state of the battery using a second sensor, and obtaining a maximum operating battery temperature and a maximum charge state from memory. The method also includes transferring electric current from regenerative braking to a thermoelectric module using a controller wherein the controller sets a polarity of the electric current to cool the battery when the actual temperature is greater than or equal to the maximum operating battery temperature, and transferring electric current from regenerative braking to the thermoelectric module using the controller wherein the controller alternates a polarity of the electric current to heat and cool the battery when the charge state is greater than or equal to the maximum charge state.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Apparatus, systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements.

Figure 1:
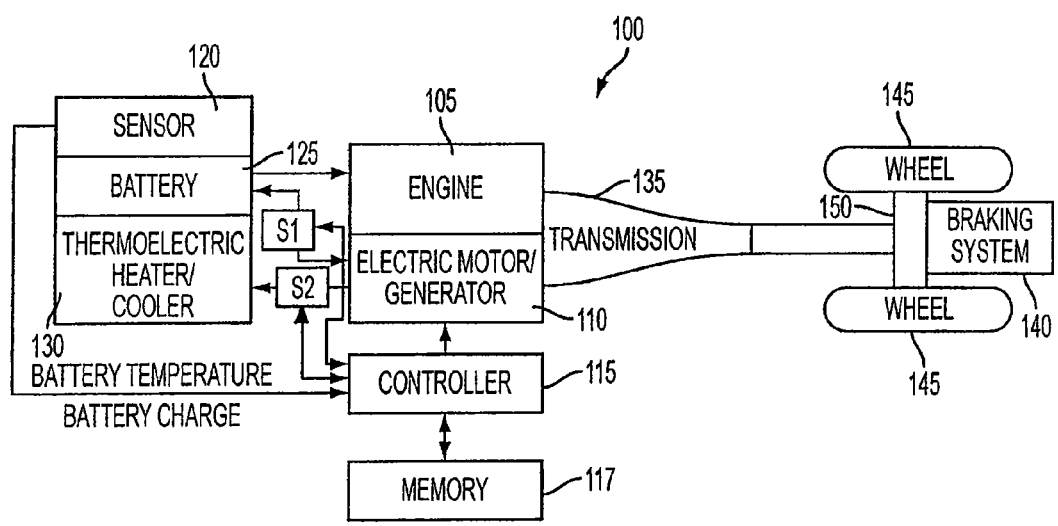
FIG. 1 is a block diagram of a system that uses thermoelectric modules to absorb waste electricity from regenerative braking according to an embodiment of the invention.

FIG. 1 is a block diagram of a system that uses thermoelectric modules to absorb waste electricity from regenerative braking according to an embodiment of the invention. The system 100 may include an engine 105, an electric motor/generator 110, a controller 115, a sensor 120, a battery 125, and a thermoelectric module 130. The system 100 may be used with a vehicle that has a transmission 135, a braking system 140, and wheels 145. The vehicle may be an automobile powered by any means (e.g., fuel cells, gasoline, hydrogen, solar, etc.) provided the vehicle is fully or partially powered by one or more batteries. For example, the vehicle may be a hybrid vehicle having a propulsion system which uses a combustion engine as one source of power, either to drive the vehicle wheels through a direct mechanical link or to generate electrical power, and also uses an electric motor to provide some or all propulsion power for the vehicle wheels.

The engine 105 can be an internal combustion engine, a fuel cell, or any other type of engine that may be hybridized to provide partial or full power to the vehicle. The engine 105 is connected to the transmission or torque converter 135, which is connected to an axle 150 that rotates to move the wheels 145.

The electric motor/generator 110 can be combined as one component or can be separate components. The electric motor/generator 110 uses electric fields and coiled wires to provide or generate electrical current to power the vehicle.

The sensor 120 measures the actual temperature of the battery 125 and determines the charge state (e.g., fully or partially charged) of the battery 125. The sensor 120 is in thermally-conductive contact with the battery 125.

The battery 125 can be a lead-acid battery, a nickel cadmium battery, a nickel metal hydride battery, a lithium-ion battery, or any other type of battery. The battery 125 may be a 12 volt battery for powering the components of the vehicle or a high-voltage battery for powering the electric motor/generator 110. Other voltages may also be used. The battery 125 may comprise one or more batteries of the same or different voltages.

The thermoelectric module 130 may have a first side and a second side. The flow of electrical current in one direction through the thermoelectric module 130 causes the first side to be heated and the second side to be cooled. Conversely, the flow of electrical current in the opposite direction through the thermoelectric module 130 causes the first side to be cooled and the second side to be heated. The first or the second side of the thermoelectric module 130 is in thermally-conductive contact with the battery 125. In one embodiment, the thermoelectric module 130 is a Peltier circuit.

The controller 115 can be any type of controller or switch which can direct the electrical current produced by the electric motor/generator 110 to the battery 125 and/or the thermoelectric module 130 based on the battery temperature and/or the battery charge received from the sensor 120. That is, if the actual battery temperature exceeds a desirable operating temperature of the battery 125, then the controller 115 may cause the electric current generated from regenerative braking to be directed to the thermoelectric module 130 in a direction of current flow that cools the battery 125. If the actual battery temperature is less than a desirable operating temperature of the battery 125, then the controller 115 may cause the electric current generated from regenerative braking to be directed to the thermoelectric module 130 in a direction of current flow that heats the battery 125. Similarly, if the charge state is fully charged, then the controller 115 may cause the electric current generated from regenerative braking to be directed to the thermoelectric module 130 in an alternating direction of current flow that serves to cool and heat the battery 125 in periodic or random fashion. The controller 115 may be coupled to a memory 117, which can be used to store a maximum operating battery temperature and a minimum operating battery temperature, and a fully-charged state of the battery 125.

The controller 115 can cause the electric motor/generator 110 to simultaneously direct electric waste energy to both the battery 125 and the thermoelectric module 130 to preserve the "engine braking" feel. In one embodiment, the thermoelectric module 130 can consume additional energy from regenerative braking to preserve the "engine braking" feel by alternately heating and cooling the battery 125 in rapid succession (e.g., every 5 seconds). The alternately heating and cooling of the battery 125 may also be periodic or random.

Figure 2:
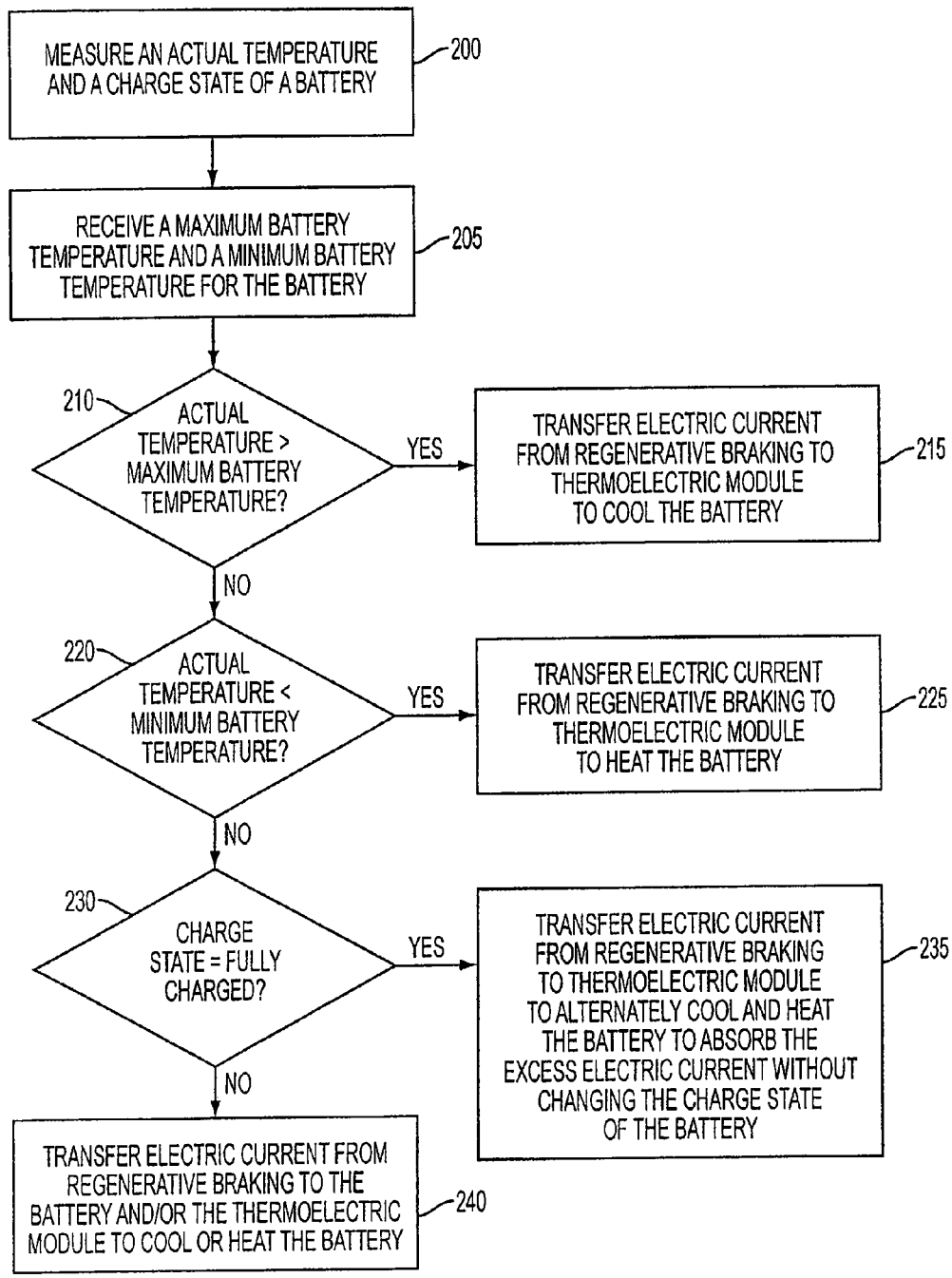
FIG. 2 is a flow chart of a method of absorbing waste electricity from regenerative braking according to an embodiment of the invention.

FIG. 2 is a flow chart of a method of absorbing waste electricity from regenerative braking according to an embodiment of the invention. The sensor 120 measures an actual temperature and a charge state of the battery 125 (block 200). The controller 115 receives the actual temperature and the charge state of the battery 125. The controller 115 also receives and/or stores a maximum battery temperature and a minimum battery temperature (block 205). If the actual temperature of the battery 125 is greater than the maximum battery temperature (i.e., battery 125 is too hot) or less than the minimum battery temperature (i.e., battery 125 is too cold) (blocks 210 and 220), then the controller 115 causes the electric motor/generator 110 to transfer electric current (i.e., waste electricity from regenerative braking) to the thermoelectric module 130 in a direction or with a polarity that cools or heats the battery 125 (blocks 215 and 225). If the charge state of the battery 125 is fully charged (i.e., battery 125 does not need any more charging) (block 230), then the controller 115 causes the electric motor/generator 110 to transfer electric current (i.e., waste electricity from regenerative braking) to the thermoelectric module 130 in a direction or with a polarity that cools or heats the battery 125 depending on the actual temperature of the battery 125 (block 235). In one embodiment, if the charge state of the battery 125 is fully charged, then the controller 115 causes the electric motor/generator 110 to transfer electric current to the thermoelectric module 130 in a direction or with a polarity that alternately (e.g., every 5 seconds) cools and heats the battery 125. If the charge state of the battery 125 is not fully charged (i.e., battery 125 needs more charging), then the controller 115 causes the electric motor/generator 110 to transfer electric current to the battery 125 and/or the thermoelectric module 130 in a direction or with a polarity that charges the battery 125 and/or cools or heats the battery 125 depending on the actual temperature of the battery 125 (block 240).

Directing the electricity from regenerative braking to the thermoelectric module 130 (rather than continuously charging the battery 125) allows the vehicle to preserve its original retarding force instead of reducing its rolling resistance and forcing the driver to increasingly rely on the braking system 140 for slowing the vehicle. The system 100 maintains or acquires optimum temperature of the battery 125. In addition, the thermoelectric module 130 provides a sink for or absorbs waste electricity or excess power during periods of time when (1) regenerative braking energy continues to be created after the battery 125 has reached its maximum charge state, (2) the battery 125 is overheating due to, for example, extended downhill driving, and (3) the battery 125 is too cold because the battery 125 has been exposed to cold temperatures.

Those of ordinary skill would appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of absorbing energy from regenerative braking, comprising:
    sensing a charge state of a battery;
    transferring an electric current from the regenerative braking to a thermoelectric module;
    adjusting a polarity of the electric current to control a heat transfer between the thermoelectric module and the battery when the sensed charge state is less than or equal to a maximum charge state of the battery; and
    adjusting the polarity of the electric current to cause the thermoelectric module to absorb heat from the battery when the sensed charge state is greater than the maximum charge state of the battery.

2. The method of claim 1, further comprising:
    transferring the electric current from the regenerative braking to the battery when the sensed charge state is equal to or less than the maximum charge state of the battery; and
    terminating the electric current transfer from the regenerative braking to the battery when the sensed charge state is greater than the maximum charge state of the battery.

3. The method of claim 1, further comprising:
    sensing a temperature of the battery; and
    adjusting the polarity of the electric current to a first polarity to cause the thermoelectric module to absorb heat from the battery when the sensed temperature is equal to or greater than a maximum operating temperature of the battery.

4. The method of claim 1, further comprising:
    sensing a temperature of the battery; and
    adjusting the polarity of the electric current to a second polarity to cause the thermoelectric module to transfer heat to the battery when the sensed temperature is equal to or less than a minimum operating temperature of the battery.

5. The method of claim 1, further comprising:
    sensing a temperature of the battery; and
    adjusting the polarity of the electric current to be at a first polarity or a second polarity based on the sensed temperature, to cause the thermoelectric module to exchange heat with the battery when the sensed temperature is between a maximum operating temperature of the battery and a minimum operating temperature of the battery.

6. The method of claim 5, wherein:
    the first polarity of the electric current causes the thermoelectric module to absorb heat from the battery, and
    the second polarity of the electric current causes the thermoelectric module to transfer heat to the battery.

7. A method of regulating a temperature of a battery for use in regenerative braking, the method comprising:
    transferring an electric current from the regenerative braking to the battery;
    sensing the temperature of the battery;
    transferring the electric current from the regenerative braking to a thermoelectric module; and
    adjusting a polarity of the electric current to enable the thermoelectric module to absorb heat from the battery when the sensed temperature is equal to or greater than a maximum operating temperature of the battery.

8. The method of claim 7, further comprising:
    adjusting the polarity of the electric current to enable the thermoelectric module to transfer heat to the battery when the sensed temperature is equal to or less than a minimum operating temperature of the battery.

9. The method of claim 7, further comprising:
    adjusting the polarity of the electric current to enable the thermoelectric module to cool or heat the battery based on the sensed temperature when the sensed temperature is between a maximum operating temperature and a minimum operating temperature of the battery.

10. The method of claim 7, further comprising:
    transferring the electric current from regenerative braking to the battery when the charge state is less than or predetermined charge state of the battery; and terminating the electric current transfer from regenerative braking to the battery when the charge state is greater than or equal to the predetermined charge state of the battery.

11. The method of claim 10, wherein the transferring the electric current to the battery includes activating a switch connecting a generator and the battery.

12. The method of claim 10, wherein the terminating the electric current to the battery includes deactivating a switch connecting a generator and the battery.

13. A method of absorbing electricity from regenerative braking, comprising:
   measuring an actual temperature of a battery using a first sensor;
   measuring a charge state of the battery using a second sensor;
   obtaining a maximum operating battery temperature and a maximum charge state from memory;
   transferring electric current from the regenerative braking to a thermoelectric module using a controller wherein the controller sets a polarity of the electric current to cool the battery when the actual temperature is greater than or equal to the maximum operating battery temperature; and
   transferring electric current from the regenerative braking to the thermoelectric module using the controller wherein the controller alternates a polarity of the electric current to heat and cool the battery when the charge state is greater than or equal to the maximum charge state.

14. The method of claim 13 further comprising obtaining a minimum operating battery temperature from the memory and transferring electric current from the regenerative braking to a thermoelectric module using the controller wherein the controller sets a polarity of the electric current to heat the battery when the actual temperature is less than or equal to the minimum operating battery temperature.

15. The method of claim 13 further comprising activating a first switch that connects the battery to a generator when the actual temperature is greater than a minimum operating battery temperature.

16. The method of claim 15 further comprising activating a second switch that connects the thermoelectric module to the generator when the actual temperature is less than the minimum operating battery temperature.

17. The method of claim 13 further comprising activating a first switch that connects the battery to a generator when the actual temperature is less than the maximum operating battery temperature.

18. The method of claim 17 further comprising activating a second switch that connects the thermoelectric module to the generator when the actual temperature is greater than the maximum operating battery temperature.

19. The method of claim 13 further comprising activating a first switch that connects the battery to a generator when the charge state is less than the maximum charge state.

20. The method of claim 19 further comprising activating a second switch that connects the thermoelectric module to the generator when the charge state is greater than the maximum charge state.

* * * * *